April 10, 1928.

N. C. RENDLEMAN 1,665,606

MANIPULATOR TABLE FOR ROLLING MILLS

Filed March 18, 1927

2 Sheets-Sheet 2

Inventor
Norman C. Rendleman,
By Emery, Booth, Janney & Varney
his Attorneys

Patented Apr. 10, 1928.

1,665,606

UNITED STATES PATENT OFFICE.

NORMAN C. RENDLEMAN, OF DORMONT, PENNSYLVANIA, ASSIGNOR TO JONES & LAUGHLIN STEEL CORPORATION, OF PITTSBURGH, PENNSYLVANIA, A CORPORATION OF PENNSYLVANIA.

MANIPULATOR TABLE FOR ROLLING MILLS.

Application filed March 18, 1927. Serial No. 176,503.

This invention relates to manipulators for roller tables for rotating a bloom or billet lying thereon about its axis through a quarter turn, and is particularly adapted for mills having grooved rolls for engaging the piece upon its diagonals, as in rolling square and "gothic" shape billets.

The invention aims to provide a simple, rugged mechanism for handling blooms and billets of all sizes from the dimensions of the ingot down, and for turning them rapidly and without shock, which will operate upon any moving piece, and which will handle either straight or crooked pieces equally well and guide them properly into the next roll pass.

Figure 1:
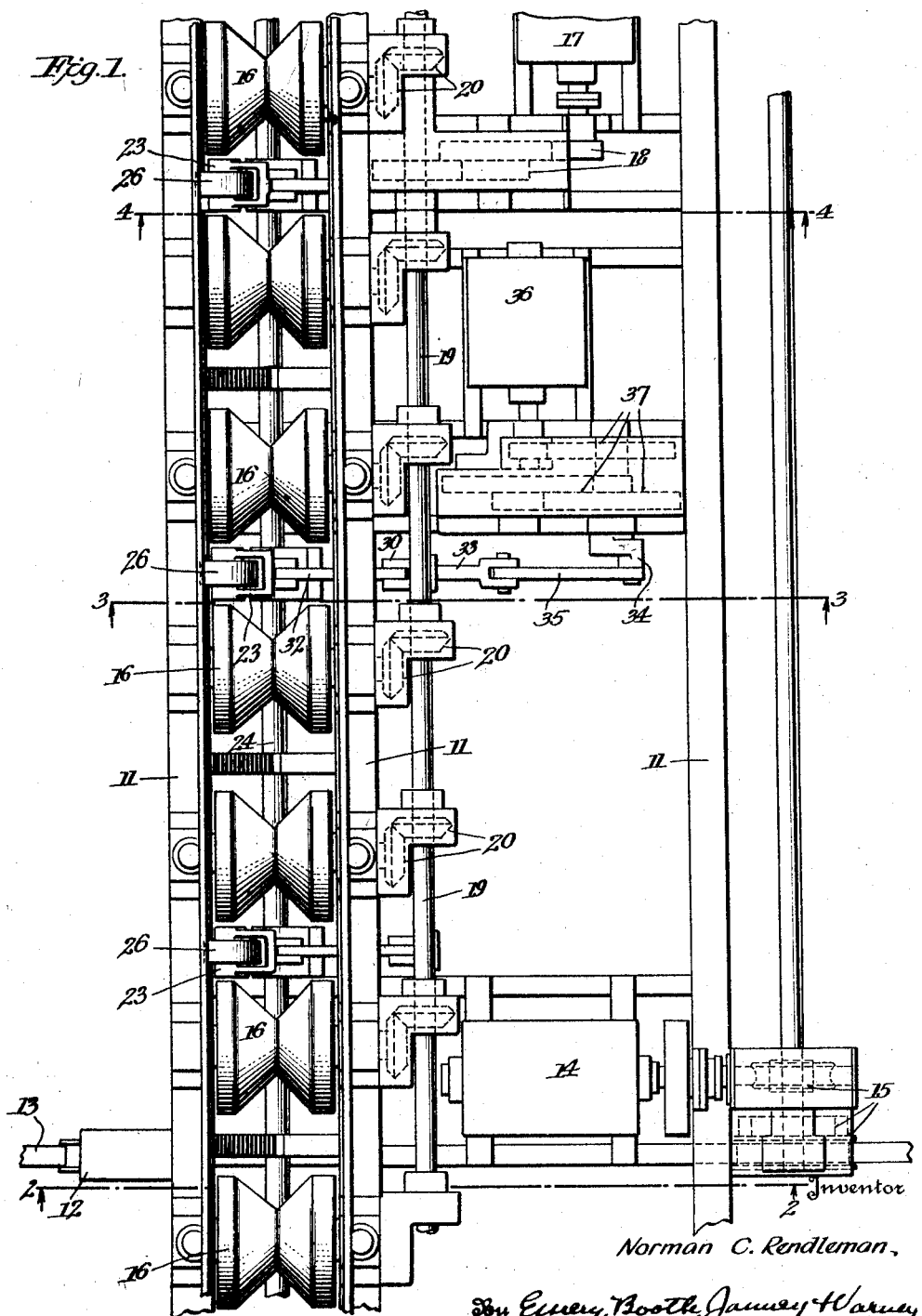
Figure 2:
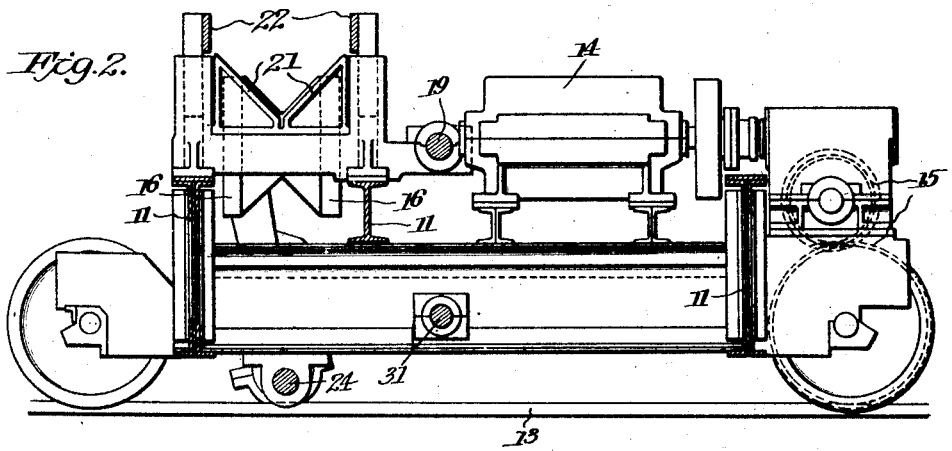
Figure 3:
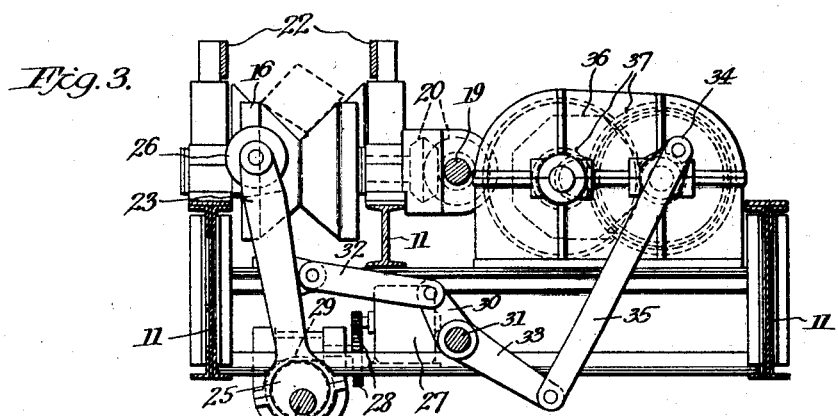
Figure 4:
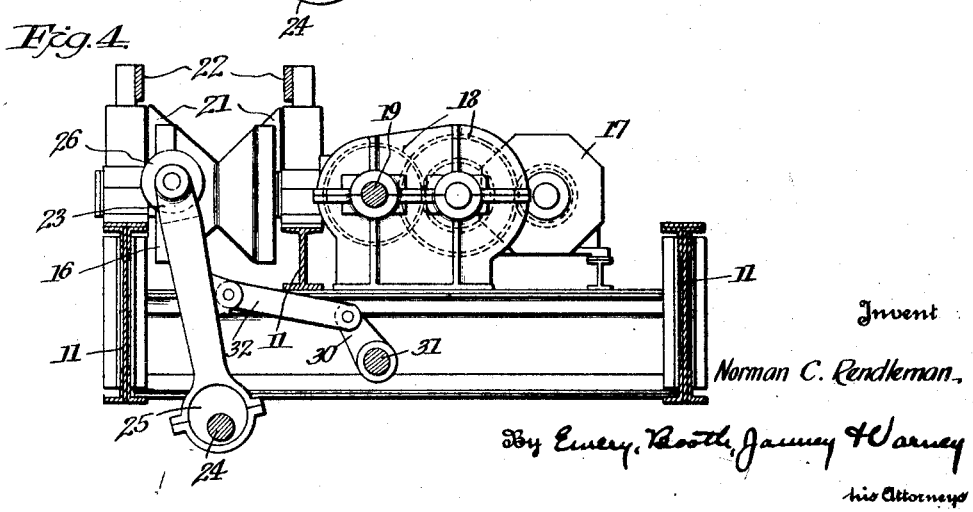

Further aims and advantages of the invention appear in connection with the description of the device illustrated in the drawings, wherein Fig. 1 is a plan view of a portion of a roller table embodying the invention, and Figs. 2, 3 and 4 are cross-sections thereof on the lines 2—2, 3—3 and 4—4 in Fig. 1, looking in the direction of the arrows.

Referring to Fig. 1 of the drawings, the roller table is of the usual traversing type, having a frame 11, supported on two pairs of wheels 12, arranged to run on track rails 13. A suitable reversible motor 14 with control devices and gearing 15 is provided for traversing the table to position it opposite the desired groove of the rolling mill, as is common practise (see Fig. 2).

The rollers 16 that support the piece being rolled are each provided with a deep groove, the sides of which are straight and inclined at right angles to one another for handling rectangular work pieces. These rollers are spaced at uniform intervals along the roller table, with their axes parallel and their grooves in alinement to form a V-shape trough for the bloom or billet or other work piece. The rollers are rotated in unison to feed the work piece in either direction by means of a reversible motor 17 provided with control devices of usual construction, and which is connected to the rollers by means of reduction gearing 18 and a longitudinal shaft 19 to which the rollers are geared by bevel gears 20 or other suitable means (see Figs. 3 and 4). Between the rollers are arranged V-shape bottom guides 21 for supporting and guiding the ends of short or crooked work pieces, and side guide rails 22 are provided above the rollers at each side of the line of grooves for preventing the work pieces from jumping out of the grooves sidewise.

The turning mechanism (see Fig. 3) comprises a series of parallel manipulator arms 23, arranged to swing in vertical arcs between the rollers 16. These arms are mounted on eccentrics 25 spaced at suitable intervals along a shaft 24 arranged beneath the line of grooves of the rollers 16.

Each of the manipulator arms 23 has a roller 26 on its upper end for engaging the work piece and the height of the rollers 26 may be adjusted to suit the size of the work piece by rotating the shaft 24 to shift the eccentrics upon which the lower ends of the arms 23 are mounted. This is accomplished preferably by a motor 27, which is connected by suitable gearing 28 with a worm and worm wheel 29 on the shaft.

The arms 23 may be oscillated back and forth across the line of the bottom of the grooves by means of cranks 30 on a rock shaft 31 to which their arms are connected by rods 32. The rock shaft may be oscillated when desired by means of a crank arm 33 from a crank 34 to which it is connected by a rod 35. The crank 34 is rotated through a half revolution to produce each oscillation of the manipulator arms 23, a motor 36 and suitable control devices and reduction gearing 37 being provided for this purpose.

The effect of the rollers 26 passing under the work piece is to lift it partly out of the grooves in the rollers 16 and permit it to roll over on to its adjacent side as the arms and rollers pass beneath it, thus rotating the piece through a quarter turn. The action is gradual and uniform, and the work piece slides up on one side of the roller groove, rolls over on the rolls 26 and slides down on the other side of the groove without shock.

The operation is the same whether the work piece is moving or stationary and irrespective of its size. The slightly lozenge shape of the work piece after passing through the rolls of the mill does not interfere with its turning, but is an advantage, because the unbalanced shape turns over more readily about its shorter axis, as is illustrated in dotted lines in Fig. 3. For the same reason the gothic shape billets turn over readily and without shock.

It is obvious that various modifications of the rollers and operating parts may be made to suit special conditions and shapes being rolled, and the invention is not restricted to the details of the apparatus illustrated.

What I claim is as follows:

1. A manipulator for partly turning square and non-circular work pieces around their longitudinal axes without lateral displacement comprising a series of grooved rolls, and work engaging devices movable transversely thereof between the rolls to engage their lower sides and lift them in the roller grooves, said work engaging devices being shaped to permit said work pieces when raised from the bottom of the roller grooves to turn over and fall back into the same grooves under the action of gravity.

2. A manipulator for partly turning square and non-circular work pieces around their longitudinal axes without lateral displacement comprising a series of grooved rolls, and work engaging devices positioned between the rolls and movable to engage their lower sides and lift them in roller grooves, said work engaging devices being shaped to permit said work pieces when raised from the bottoms of the roller grooves to turn over and fall back into the same grooves under the action of gravity.

3. A manipulator of the character described comprising a roller table having grooved rollers, a series of arms arranged to oscillate across the axis of the table between the rollers, said arms being pivoted at their lower ends in central alinement with the roller grooves below the level of the table and having means on their upper ends for engaging the under side of the work piece, and means for oscillating said arms simultaneously to lift the work pieces up one side of the grooves in the rollers and let it tip over.

4. A manipulator of the character described having grooved rollers adapted to support a rectangular work piece cornerwise, means supported below the line of the groove and movable transversely thereof for engaging the lower side of the work piece and raising it up one side of the groove, said means being adapted to pass under the work piece and permit it to tilt over against the other side of the groove.

5. A manipulator of the character described having grooved rollers adapted to support a rectangular work piece cornerwise, a series of levers with their pivot ends mounted below the line of the groove and their upper ends free to move transversely thereof for engaging the lower side of the work piece and raising it up one side of the groove, said upper ends being adapted to pass under the work piece and permit it to tilt over against the other side of the groove.

6. A manipulator of the character described having grooved rollers adapted to support a rectangular work piece cornerwise, a series of arms mounted to swing crosswise of and below the line of the groove and provided with rollers on their ends for engaging the lower side of the work piece and raising it up one side of the groove, said rollers being adapted to pass under the work piece and permit it to tilt over against the other side of the groove.

7. A manipulator of the character described having grooved rollers adapted to support a rectangular work piece cornerwise, a series of arms mounted to swing crosswise of and below the line of the groove and provided with rollers on their ends for engaging the lower side of the work piece and raising it up one side of the groove, said arms being adjustable vertically to suit the size of the work piece, and said rollers being adapted to pass under the work piece and permit it to tilt over against the other side of the groove.

8. A manipulator of the character described having grooved rollers adapted to support a rectangular work piece cornerwise, means adjustably supported below the line of the groove and movable transversely thereof for engaging the lower side of the work piece and raising it up one side of the groove, said means being adapted to pass under the work piece and permit it to tilt over against the other side of the groove.

9. In a device of the character described a series of grooved rollers 16 arranged for turning movement to catch and feed a billet or bloom, a shaft 24 arranged lengthwise of the series of rollers below their grooves, eccentrics 25 spaced thereon, arms 23 on said eccentrics with their upper ends arranged to swing between the rollers, rolls 26 on the ends of the arms adapted to engage the under side of the billet or bloom and lift it in the roller grooves, means for rotating said shaft 24 to adjust the height of said rollers, means for oscillating said arms comprising connections to a rock shaft 31, and means for rocking said shaft including a lever 33 and a crank 34 and connection 35 for oscillating said lever first in one direction and then in the reverse direction for each rotation of the crank 34, and suitable means for turning said crank as desired.

10. In a device of the character described a series of grooved rollers 16 arranged for turning movement to catch and feed a billet or bloom, a shaft 24 arranged lengthwise of the series of rollers below their grooves, eccentrics 25 spaced thereon, arms 23 on said eccentrics with their upper ends arranged to swing between the rollers, rolls 26 on the ends of the arms adapted to engage the under side of the billet or bloom and lift it in the roller grooves, means for rotating said shaft 24 to adjust the height of said rollers, means for oscillating said arms comprising connections to a rock shaft 31, and means for rocking said shaft.

11. In a device of the character described having grooved rollers for receiving a work piece, means adapted to engage said work piece from either side to push it up the opposite side of said groove and upon passing under its lower edge permit it to tilt over against the side of the groove from which it was pushed, thereby to turn it to rest upon its adjacent side.

12. A manipulator for partly turning work pieces comprising a roller table having parallel rollers provided with grooves in alinement to form a trough, the sides of the groove being inclined, means adapted to engage said work piece from either side to push it up the opposite side of said trough and upon passing under its lower edge permit it to tilt over against the side of the trough from which it was pushed, thereby to turn it to rest upon its adjacent side.

In testimony whereof I have signed my name to this specification.

NORMAN C. RENDLEMAN.